United States Patent
Hp et al.

(10) Patent No.: US 9,571,651 B2
(45) Date of Patent: Feb. 14, 2017

(54) FAR-END INITIATED MID-CALL NOTIFICATION VIA RING-PING

(71) Applicant: Avaya Inc., Santa Clara, CA (US)

(72) Inventors: Ananda Hp, Pune (IN); Sumit Bijwe, Pune (IN)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 14/722,512

(22) Filed: May 27, 2015

(65) Prior Publication Data

US 2016/0352903 A1    Dec. 1, 2016

(51) Int. Cl.
*H04M 1/00* (2006.01)
*H04M 3/42* (2006.01)
*H04M 3/51* (2006.01)
*H04M 3/428* (2006.01)
*H04M 3/48* (2006.01)

(52) U.S. Cl.
CPC ........... *H04M 3/5191* (2013.01); *H04M 3/428* (2013.01); *H04M 3/4286* (2013.01); *H04M 3/48* (2013.01)

(58) Field of Classification Search
CPC ........ G10L 15/00; G06Q 10/06; H04M 3/323; H04M 3/36; H04M 3/4217; H04M 3/4285; H04M 3/42195; H04M 3/493; H04M 3/4931; H04M 3/4933; H04M 3/4935; H04M 3/4936; H04M 3/4938; H04M 3/42221; H04M 3/51; H04M 3/5166; H04M 3/5175; H04M 3/5183; H04M 3/5191; H04M 3/523; H04M 3/5231; H04M 3/5232; H04M 3/5233; H04M 3/5235; H04M 3/5237; H04M 3/5238; H04M 2203/2011; H04M 2203/2061; H04M 2242/00; H04M 2242/08; H04M 2242/12
USPC .......... 379/210.01, 265.01, 265.02, 265.03,379/265.04, 265.05, 265.06, 265.07, 265.08,379/265.09, 265.1, 265.11, 265.12, 265.13,379/265.14, 266.01, 266.02, 266.03, 266.04,379/266.05, 266.06, 266.07, 266.08, 266.09,379/266.1
See application file for complete search history.

(56) References Cited

U.S. PATENT DOCUMENTS

| | | | | |
|---|---|---|---|---|
| 4,731,822 A * | 3/1988 | Berry, III | .......... | H04M 3/42314 379/163 |
| 5,309,028 A * | 5/1994 | Brown | .......... | H04M 3/465 370/264 |
| 5,392,346 A * | 2/1995 | Hassler | .......... | H04M 3/38 379/196 |
| 6,718,026 B1 * | 4/2004 | Pershan | .......... | H04M 3/4938 379/207.16 |
| 6,768,722 B1 * | 7/2004 | Katseff | .......... | H04M 3/428 370/260 |
| 6,823,057 B1 * | 11/2004 | Pershan | .......... | H04M 3/02 379/201.01 |

(Continued)

*Primary Examiner* — Khai N. Nguyen
(74) *Attorney, Agent, or Firm* — Sheridan Ross P.C.

(57) ABSTRACT

Placing a call on hold provides advantages to the party initiating the hold. The party may engage in another call or perform another action and return to the call when convenient, provided the party placed on hold is still on the call. The party on hold monitors the inactive call and waits until the call is reactivated. The party on hold is provided with a means to alert the other party via a session initiation protocol (SIP) message formatted as a ring-ping message. The message is sent to the party who placed the call on hold and the user's device activates an indicator, such as to alert the holding party that the held party wishes to re-engage the call. If the holding party does not un-hold the call or otherwise (Continued)

acknowledge the ring-ping indicator, another action can be initiated, such as by inviting another party to join the call.

19 Claims, 7 Drawing Sheets

(56) References Cited

U.S. PATENT DOCUMENTS

| | | | | |
|---|---|---|---|---|
| 7,050,558 | B1* | 5/2006 | Pershan | H04M 3/42153 379/211.02 |
| 8,284,911 | B1* | 10/2012 | Kalmanek, Jr. | H04M 15/00 379/114.21 |
| 8,634,543 | B2 | 1/2014 | Flockhart et al. | |
| 2003/0134662 | A1* | 7/2003 | Shah | H04W 76/066 455/560 |
| 2007/0274284 | A1* | 11/2007 | Dendukuri | H04L 12/2602 370/351 |
| 2008/0084980 | A1* | 4/2008 | Florkey | H04M 3/53316 379/201.01 |
| 2008/0119173 | A1* | 5/2008 | Nguyen | H04M 3/4285 455/414.1 |
| 2008/0232351 | A1* | 9/2008 | Takahashi | H04L 65/1069 370/352 |
| 2010/0235218 | A1 | 9/2010 | Erhart et al. | |
| 2010/0296417 | A1 | 11/2010 | Steiner | |
| 2011/0125793 | A1 | 5/2011 | Erhart et al. | |
| 2011/0125826 | A1 | 5/2011 | Erhart et al. | |
| 2011/0125862 | A1 | 5/2011 | Payne et al. | |

* cited by examiner

FAR-END INITIATED MID-CALL NOTIFICATION VIA RING-PING

FIELD OF THE DISCLOSURE

The present disclosure is generally directed toward digital telephone signaling messages.

BACKGROUND

In an enterprise environment, an active call between a first caller's user agent (UA1) and a callee's user agent (UA2) has been put on hold by UA2. The call has been on hold for quite a long time, which may be subjective based on factors such as the caller's patience. If the user of UA1 wishes to communicate with UA2, they must utilize another communication channel (e.g., email, text message, attempt to drop and re-establish the call, etc.). The UA1 cannot do anything to get back to UA2 to indicate that the call has been put on hold for quite a long duration and expects some action.

In a call center environment, an active call between a caller (customer) and a call center agent has been put on hold by an agent, such as to allow the agent to investigate an issue. The caller also investigates the issue and discovers a fact that may assist the agent in resolving the issue. The caller would like to provide this newly discovered fact to the agent; however, the agent has placed the call on hold. The caller is forced to wait until the agent resumes the call or the customer hangs up, perhaps to call back to start anew with a new agent.

SUMMARY

It is with respect to the above issues and other problems that the embodiments presented herein were contemplated. In one embodiment, a first user using a first user agent (UA1) is engaged in a call with a second user using a second user agent (UA2). Mid-call, UA2 places the call on hold. The first user wishes to resume the call and presses a notification button, such as "ring-ping." As a result, a Session Initiation Protocol (SIP) message is created and sent to UA2 over the signaling stream, which, in turn, causes UA2 to display a notification (e.g., light, tone, message, etc.). The second user may then take the call off hold and re-establish the conversation with the first user. The second user may have the further option to ignore the notification, which may cause any subsequent ring-ping messages received during the call to be ignored by UA2.

In another embodiment, if the second user does not acknowledge the ring-ping, a call server may respond with a pre-selected or automatically determined response. The response may be to unhold the call, transfer the call to the attendant, another agent, or other party, as may be determined based upon business logic, call server functionality, and/or other factor.

In another embodiment, such as an enterprise environment, an active conference call is underway and includes a number of user agents (e.g., UA1, UA2, UA3, . . . , UA999). UA1 is serving as the host of the conference and a UA3 is being used by an inactive participant. The host user may not wish to disrupt the conference with a status request (e.g., "UA3 are you still there") or such a request may have already been made, but was unresponsive, such as when the user of UA3 is unable to hear the request (e.g., the user of UA3 may have placed the conference on hold to make another call, left the room having UA3, silenced the speaker, engaged in an in-person conversation, etc.). UA1 initiates a ring-ping message to UA3 by selecting the corresponding participant (UA3) from the list of conferees. Depending on the response, the host can take the appropriate action, such as dropping UA3 from the conference to free up the resource acquired by the participant using UA3. Alternatively, UA3 may acknowledge the ring-ping and resume the call. As a further alternative, UA3 may acknowledge the ring-ping by actively ignoring the notification (e.g., select an "ignore" option associated with the ring-ping indicator presented by UA3), in which case the host may elect to maintain the conference, including UA3, or drop UA3, as appropriately determined.

In a further embodiment, if UA3 does not acknowledge the ring-ping, the host using UAL a call server, or other entity may initiate another action, such as un-holding the call, transferring the call to the user's supervisor, or other action, as may be performed as a matter of implementation and/or user choice.

In another embodiment, the ring-ping message is initiated by a user selecting an option on their associated user agent (e.g., telephone, softphone, etc.). When the user invokes the ring-ping feature, a call processing message is built, such as by using a standard call signaling protocol (e.g., SIP, H.323, etc). The message is sent to a call server, which maintains the call state-machine of the call and sends the ring-ping message to cause an audible ring alert, visual notification, and/or tactile message to the party, which has put the call on hold. Optionally, a timer may be started. If the ring-ping acknowledgement has not been received before the timer reaches a previously determined limit, a timeout condition may be indicated. In response to the timeout condition, the call server may then execute a business rule or other instruction to respond to the timeout condition.

In one embodiment, a communication server is disclosed, comprising: a network interface configured to facilitate a call between a first user agent and a second user agent; and a processor configured to receive from the first user agent a ring-ping message during the call between the first user agent and the second user agent and forward the ring-ping message to the second user agent.

In another embodiment, a first communication device is disclosed, comprising: a network interface configured to facilitate a call with a second communication device; a user input option associated with a ring-ping message; and a processor configured to, during the call and upon receiving a user input associated with the user input option, initiate a ring-ping message and cause the network interface to send the ring-ping message to the second communication device.

In another embodiment, a first communication device, comprising: a network interface configured to facilitate a call with a second communication device; a ring-ping alert indicator; and a processor configured to, during the call and while the call is absent content provided by the first communication device, receive a ring-ping message via the network interface and cause the ring-ping alert indicator to activate.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium," as used herein, refers to any tangible storage that participates in providing instructions to a processor for execution. Such a medium may take many forms, including, but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid-state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module," as used herein, refers to any known or later-developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices that may be shown in block diagram form, and are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
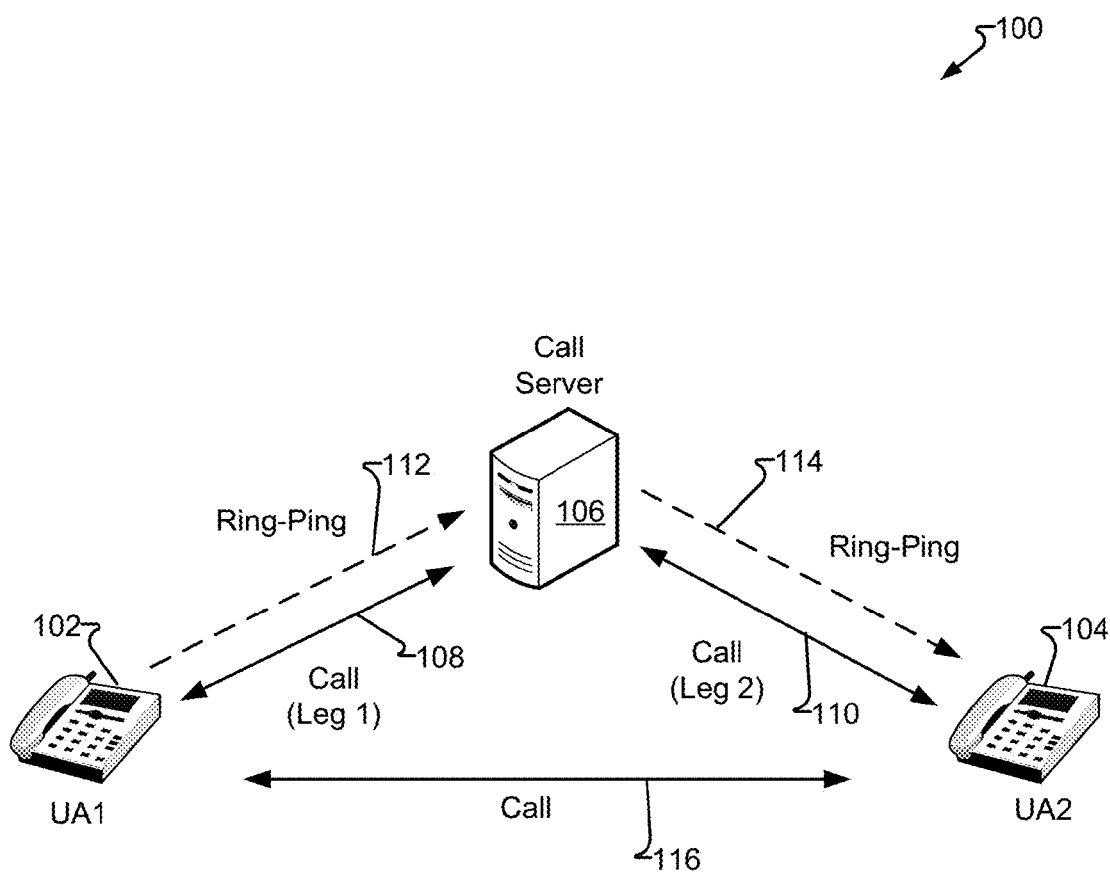
FIG. 1 depicts a first system in accordance with embodiments of the present disclosure.

FIG. 1 depicts system 100 in accordance with embodiments of the present disclosure. In one embodiment, system 100 illustrates call 116 with two parties when using user agent 102 and another party using user agent 104. Between user agent 102 and user agent 104, call server 106 provides a signaling channel and optionally a media channel therebetween. A call is established between user agent 102 and user agent 104 comprising call (leg 1) 108 and call (leg 2) 110. For convenience, the communication comprising the combination of call (leg 1) 108, call server 106, and call (leg 2) 110 is referred to herein as call 116. During the course of call 116, user agent 104 becomes inactive and call 116 is absent content provided by the user associated with user agent 104. In one embodiment, call 116 is inactive due to user agent 104 placing the call on hold. In another embodiment, call 116 is inactive due to lack of participation by the user associated with user agent 104.

User agent 102 may be presented with silence, music on hold, miscellaneous background noises, or other sounds, which are not associated with the participation of user agent 104, in call 116. A user associated with user agent 102 may wish to notify the user associated with user agent 104 that they wish to continue the conversation. However, as user agent 104 has placed the call on hold, conversational sounds (e.g., speaking, yelling, etc.) are not presented by user agent 104. User agent 102 receives an input from an associated user initiating a ring-ping message, in response to the input, user agent 102 causes ring-ping message 112 to be sent from user agent 102 to call server 106.

User agent 104 receives ring ping message 114 forwarded from call server 106. User agent 104 then activates an indicator associated with ring-ping message 114. The indicator may be auditable, visual, and/or tactile. As a result, a user associated with user agent 104 may then take the call off of hold and reengage the conversation with the user associated with user agent 102.

User agents, such as user agent 102, 104, may comprise a softphone, such as a computer executing a communications client, or a telephone endpoint, such as a digital telephone. As can be appreciated, other devices may be utilized as user agents when capable of operating in a digital system, such as to convey SIP messages and or utilize and attach devices providing such functionality. For example, user agent 102 may be operated as a headset or other device with limited functionality in communication with the base station, such as a digital telephone, which then provides SIP message functionality on behalf of the headset or other device.

System 100 illustrates user agent 102, user agent 104, and the communication therebetween in the form of call 116 and messages, such as ring-ping message 112, 114. However, it should be appreciated that additional user agents, endpoints, and/or other communication devices may be associated with call 116 without departing from disclosures provided herein.

Figure 2:
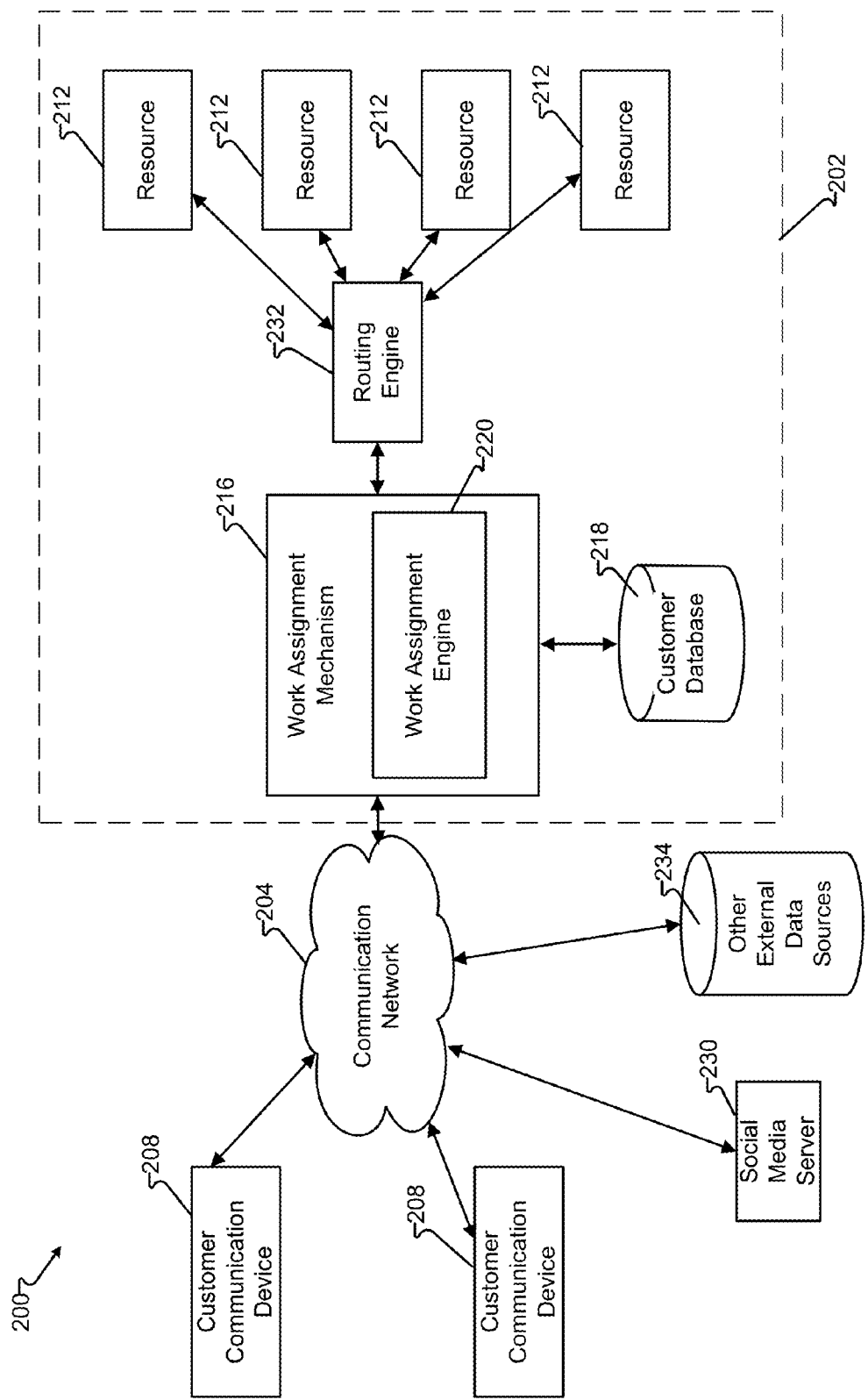
FIG. 2 depicts a second system in accordance with embodiments of the present disclosure.

With reference now to FIG. 2, communication system 200 is discussed in accordance with at least some embodiments of the present disclosure. The communication system 200 may be a distributed system and, in some embodiments, comprises a communication network 204 connecting one or more communication devices 208 to a work assignment mechanism 216, which may be owned and operated by an enterprise administering contact center 202, in which a plurality of resources 212 are distributed to handle incoming work items (in the form of contacts) from customer communication devices 208.

Contact center 202 is variously embodied to receive and/or send messages that are or are associated with work items and the processing and management (e.g., scheduling, assigning, routing, generating, accounting, receiving, monitoring, reviewing, etc.) of the work items by one or more resources 212. The work items are generally generated and/or received requests for a processing resource 212 embodied as, or a component of, an electronic and/or electromagnetically conveyed message. Contact center 202 may include more or fewer components than illustrated and/or provide more or fewer services than illustrated. The border indicating contact center 202 may be a physical boundary (e.g., a building, campus, etc.), legal boundary (e.g., company, enterprise, etc.), and/or logical (e.g., resources 212 utilized to provide services to customers for a customer of contact center 202).

Furthermore, the border illustrating contact center 202 may be as-illustrated or, in other embodiments, include alterations and/or more and/or fewer components than illustrated. For example, in other embodiments, one or more of resources 212, customer database 218, and/or other component may connect to routing engine 232 via communication network 204, such as when such components connect via a public network (e.g., Internet). In another embodiment, communication network 204 may be a private utilization of, at least in part, a public network (e.g., VPN); a private network located, at least partially, within contact center 202; or a mixture of private and public networks that may be utilized to provide electronic communication of components described herein. Additionally, it should be appreciated that components illustrated as external, such as social media server 230 and/or other external data sources 234 may be within contact center 202 physically and/or logically, but still be considered external for other purposes. For example, contact center 202 may operate social media server 230 (e.g., a website operable to receive user messages from customers and/or resources 212) as one means to interact with customers via their customer communication device 208.

Customer communication devices 208 are embodied as external to contact center 202 as they are under the more direct control of their respective user or customer. However, embodiments may be provided whereby one or more customer communication devices 208 are physically and/or logically within contact center 202, such as when a customer utilizes customer communication device 208 at a kiosk, attaches to a private network of contact center 202 (e.g., WiFi connection to a kiosk, etc.) within or controlled by contact center 202 and still is considered external to contact center 202.

It should be appreciated that the description of contact center 202 provides at least one embodiment whereby the following embodiments may be more readily understood without limiting such embodiments. Contact center 202 may further be altered, added to, and/or subtracted from without departing from the scope of any embodiment described herein and without limiting the scope of the embodiments or claims, except as expressly provided.

Additionally, contact center 202 may incorporate and/or utilize social media server 230 and/or other external data sources 234 may be utilized to provide one means for a resource 212 to receive and/or retrieve contacts and connect to a customer of a contact center 202. Other external data sources 234 may include data sources, such as service bureaus, third-party data providers (e.g., credit agencies, public and/or private records, etc.). Customers may utilize their respective customer communication device 208 to send/receive communications utilizing social media server 230.

In accordance with at least some embodiments of the present disclosure, the communication network 204 may comprise any type of known communication medium or collection of communication media and may use any type of protocols to transport electronic messages between endpoints. The communication network 204 may include wired and/or wireless communication technologies. The Internet is an example of the communication network 204 that constitutes an Internet Protocol (IP) network consisting of many computers, computing networks, and other communication devices located all over the world, which are connected through many telephone systems and other means. Other examples of the communication network 204 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 204 need not be limited to any one network type, and instead may be comprised of a number of different networks and/or network types. As one example, embodiments of the present disclosure may be utilized to increase the efficiency of a grid-based contact center 202. Examples of a grid-based contact center 202 are more fully described in U.S. Patent Publication No. 2010/0296417 to Steiner, the entire contents of which are hereby incorporated herein by reference. Moreover, the communication network 204 may comprise a number of different communication media, such as coaxial cable, copper cable/wire, fiber-optic cable, antennas for transmitting/receiving wireless messages, and combinations thereof.

The communication devices 208 may correspond to customer communication devices. In accordance with at least some embodiments of the present disclosure, a customer may utilize their communication device 208 to initiate a work item Illustrative work items include, but are not limited to, a contact directed toward and received at a contact center 202, a web page request directed toward and received at a server farm (e.g., collection of servers), a media request, an application request (e.g., a request for an application's resource location on a remote application server, such as a SIP application server), and the like. The work item may be in the form of a message or collection of messages transmitted over the communication network 204. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 216, but rather may be on some other server in the communication network 204 where it is harvested by the work assignment mechanism 216, which generates a work item for the harvested communication, such as social media server 230. An example of such a harvested communication includes a social media communication that is harvested by the work assignment mechanism 216 from a social media network or server. Exemplary architectures for harvesting social media communications and generating work items based thereon are described in U.S. patent application Ser. Nos. 12/784,369, 12/706,942, and 12/707,277, filed Mar. 20, 1010, Feb. 17, 2010, and Feb. 17, 2010, respectively, each of which is hereby incorporated herein by reference in its entirety.

The format of the work item may depend upon the capabilities of the communication device 208 and the format of the communication. In particular, work items are logical representations within a contact center 202 of work to be performed in connection with servicing a communication received at contact center 202 (and, more specifically, the work assignment mechanism 216). The communication may be received and maintained at the work assignment mechanism 216, a switch or server connected to the work assignment mechanism 216, or the like, until a resource 212 is assigned to the work item representing that communication at which point the work assignment mechanism 216 passes the work item to a routing engine 232 to connect the communication device 208, which initiated the communication with the assigned resource 212.

Although the routing engine 232 is depicted as being separate from the work assignment mechanism 216, the routing engine 232 may be incorporated into the work assignment mechanism 216 or its functionality may be executed by the work assignment engine 220.

In accordance with at least some embodiments of the present disclosure, the communication devices 208 may comprise any type of known communication equipment or collection of communication equipment. Examples of a suitable communication device 208 include, but are not limited to, a personal computer, laptop, Personal Digital Assistant (PDA), cellular phone, smart phone, telephone, or combinations thereof. In general, each communication device 208 may be adapted to support video, audio, text, and/or data communications with other communication devices 208 as well as the processing resources 212. The type of medium used by the communication device 208 to communicate with other communication devices 208 or processing resources 212 may depend upon the communication applications available on the communication device 208.

In accordance with at least some embodiments of the present disclosure, the work item is sent toward a collection of processing resources 212 via the combined efforts of the work assignment mechanism 216 and routing engine 232. The resources 212 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact center 202.

As discussed above, the work assignment mechanism 216 and resources 212 may be owned and operated by a common entity in a contact center 202 format. In some embodiments, the work assignment mechanism 216 may be administered by multiple enterprises, each of which has its own dedicated resources 212 connected to the work assignment mechanism 216.

In some embodiments, the work assignment mechanism 216 comprises a work assignment engine 220, which enables the work assignment mechanism 216 to make intelligent routing decisions for work items. In some embodiments, the work assignment engine 220 is configured to administer and make work assignment decisions in a queueless contact center 202, as is described in U.S. patent application Ser. No. 12/882,950, the entire contents of which are hereby incorporated herein by reference. In other embodiments, the work assignment engine 220 may be configured to execute work assignment decisions in a traditional queue-based (or skill-based) contact center 202.

The work assignment engine 220 and its various components may reside in the work assignment mechanism 216 or in a number of different servers or processing devices. In some embodiments, cloud-based computing architectures can be employed whereby one or more components of the work assignment mechanism 216 are made available in a cloud or network such that they can be shared resources among a plurality of different users. Work assignment mechanism 216 may access customer database 218, such as to retrieve records, profiles, purchase history, previous work items, and/or other aspects of a customer known to contact center 202. Customer database 218 may be updated in response to a work item and/or input from resource 212 processing the work item.

In one embodiment, a message is generated by customer communication device 208 and received, via communication network 204, at work assignment mechanism 216. The message received by a contact center 202, such as at the work assignment mechanism 216, is generally, and herein, referred to as a "contact." Routing engine 232 routes the contact to at least one of resources 212 for processing.

In one embodiment, at least one resource 212 comprises a human agent and a user agent, such as user agent 104 utilized by the human agent. In another embodiment, the user agent, such as user agent 102, comprises customer communication device 208 when embodied to communicate with communications network 204 and resources there beyond via a SIP protocol. Call server 106 may be provided as a component of communication network 204 or as a discrete or shared component with another device, such as routing engine 232.

Figure 3:
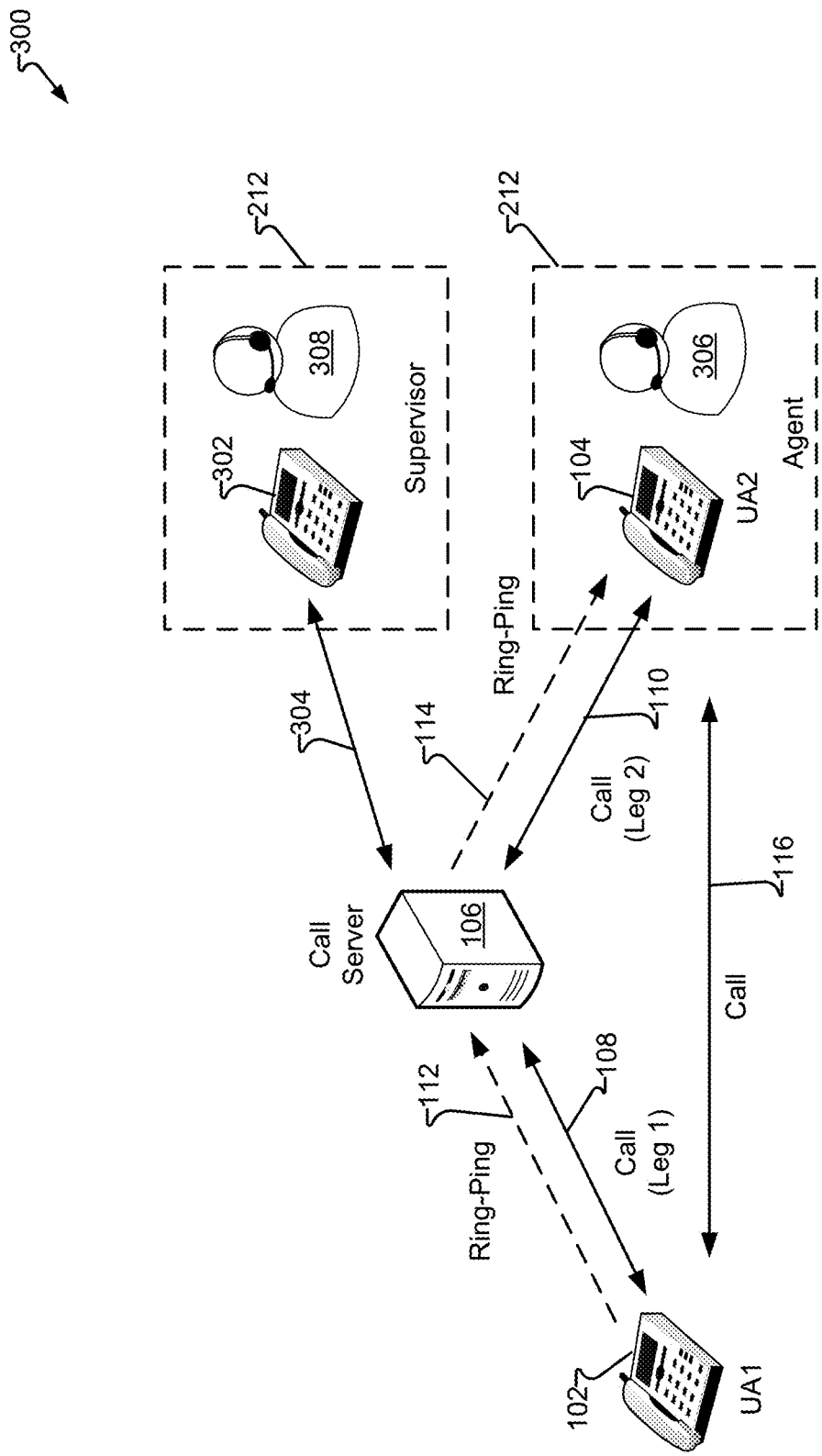
FIG. 3 depicts a third system in accordance with embodiments of the present disclosure.

FIG. 3 depicts system 300 in accordance with embodiments of the present disclosure. In one embodiment, system 300 illustrates select components of contact center 202 (See FIG. 2) and wherein customer communication device 208 is embodied as user agent 102 and resource 212 comprises a user agent, such as user agent 104 and user agent 302.

In one embodiment, user agent 102 places a call 108 utilizing call server 106, which is in turn forwarded as call 110, to user agent 104 comprising a portion of resource 212, and collectively known as call 116. Agent 306 becomes inactive, such as by silence or other lack of participation or by placing the call on hold. A period of time passes and call 116 is removed from hold and the conversation associated with call 116 continues normally. However, if the period of time passes and call 116 is not removed from hold, call server 106 or alternatively user agent 104 in communication with call server 106, may authorize the use of a ring-ping feature on user agent 102. For example, user agent 102 may comprise a soft button that displays a ring-ping option, a hard button becomes enabled, or other user input becomes functionally enabled to cause the creation of ring ping message 112.

Once selected by the user, or activated and then selected by the user, the ring-ping option initiates ring-ping message 112 to the call server 106, which is then forwarded as ring-ping message 114 to user agent 104. At which point, agent 306 may be presented with an indicator of the ring-ping and respond accordingly. In one embodiment, agent 306 takes call 116 off of hold and call 116 then proceeds normally, which may further include agent 306 placing call 116 on hold a subsequent one or more times. In another embodiment, agent 306 provides no response to the ring-ping indicator. Accordingly, at least one of user agent 104 and call server 116 initiates a timer whereby, if acknowledgment has not been received, call server 106 sends a SIP INVITE message, message, notification, or other communication to supervisor resource 212, comprising supervisor agent 308 and user agent 302. In a further embodiment, call server 106 sends an invite message to supervisor agent 308 who accepts the call on user agent 302 whereby a response message causes call 116 to include call leg 304. As can be appreciated, supervisor agent 308 may be a coworker, or other personnel, or automated resource to further facilitate the purpose of call 116 and/or inform the user associated with user agent 102 of the present status of agent 306, or other purpose as may be deemed necessary from time to time.

Figure 4:
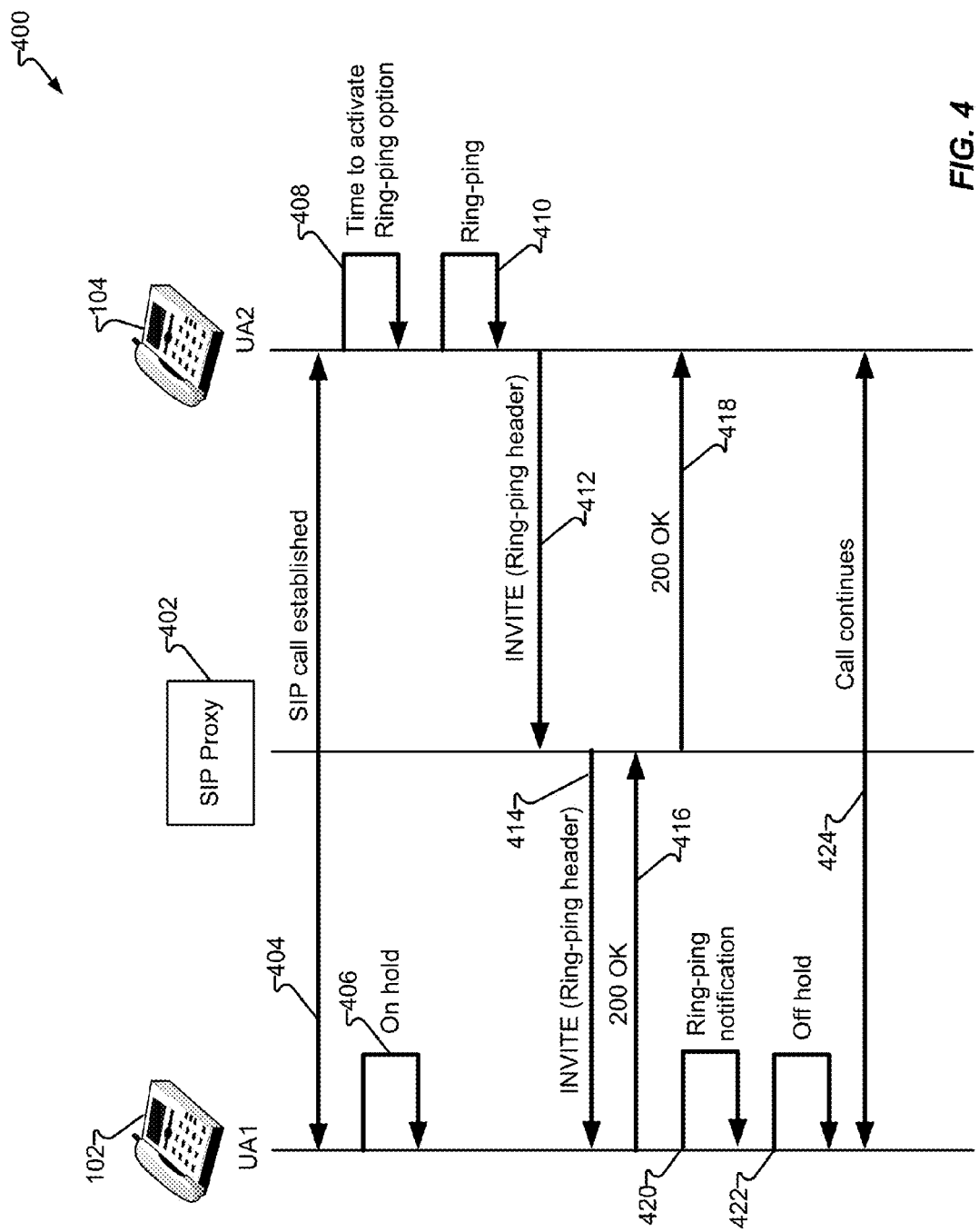
FIG. 4 depicts a first interaction in accordance with embodiments of the present disclosure.

FIG. 4 depicts interaction 400 in accordance with embodiments of the present disclosure. In one embodiment, user agent 102 and user agent 104, utilizing SIP proxy 402, have established a call 404. User agent 102 places the call on hold 406. User agent 104 initiates timer 408 that, upon expiring, causes ring-ping 410 to activate. A user associated with user agent 104 that initiates ring-ping message 412 forwarded to SIP proxy 402. SIP proxy 402 then forwards invite 414 to user agent 102. In response, SIP message 200 OK 418 is forwarded back to SIP proxy 402, which is in turn forwarded as SIP message 200 OK 418 is forwarded to user agent 104.

At a point following receipt of invite message 414, ring-ping notification 420 is initiated. User agent 102 then goes off of hold 422 thereby allowing the continuation of the call 424.

In another embodiment, 200 OK messages 416, 418 are omitted. In yet another embodiment, SIP message 200 OK 416 causes SIP proxy 402 to initiate a timer that, upon expiration, signals another party, such as supervisor agent 308 (see FIG. 3) of the lack of response, unless off hold 422 occurs before said expiration of timer.

Figure 5:
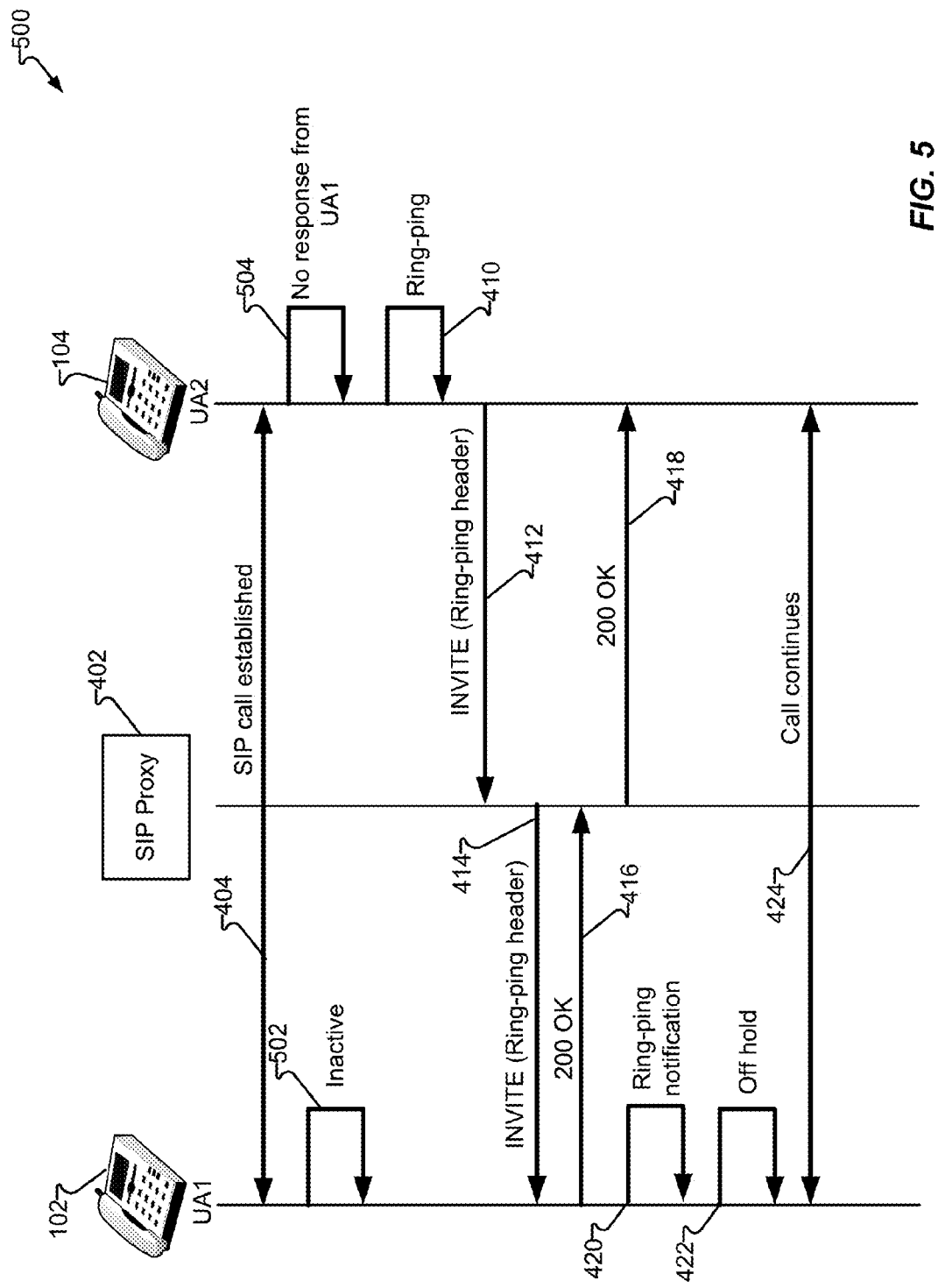
FIG. 5 depicts a second interaction in accordance with embodiments of the present disclosure.

FIG. 5 depicts interaction 500 in accordance with embodiments of the present disclosure. In one embodiment, interaction 500 comprises at least a portion of the interaction disclosed with respect to interaction 400 (see FIG. 4). However, interaction 500 does not place the call established in segment 404 on hold. User agent 102 becomes inactive 502. Inactive 502, may comprise a lack of contribution from the user associated with the call establish an segment 404, silence, and/or other inactivity. User agent 104 may detect the lack of voice, and/or other signal associated with participation of the call established during segment 404. In response to not receiving a response from user agent 102, 504, ring-ping 410 becomes activated.

Once activated, and initiated by the user associated with user agent 104, invite message 412 proceeds to SIP proxy 402 and is then forwarded to user agent 102 as invite message 414. In response, user agent 102 respond with SIP message 200 OK 416 to SIP proxy 402 and is forwarded as a SIP message 200 OK 418 to user agent 104. At some point following receipt of invite 414, ring-ping notification 420 is initiated to alert the user associated therewith. The call established during segment 404 is released from hold 422 whereby the call continues at segment 424.

Figure 6:
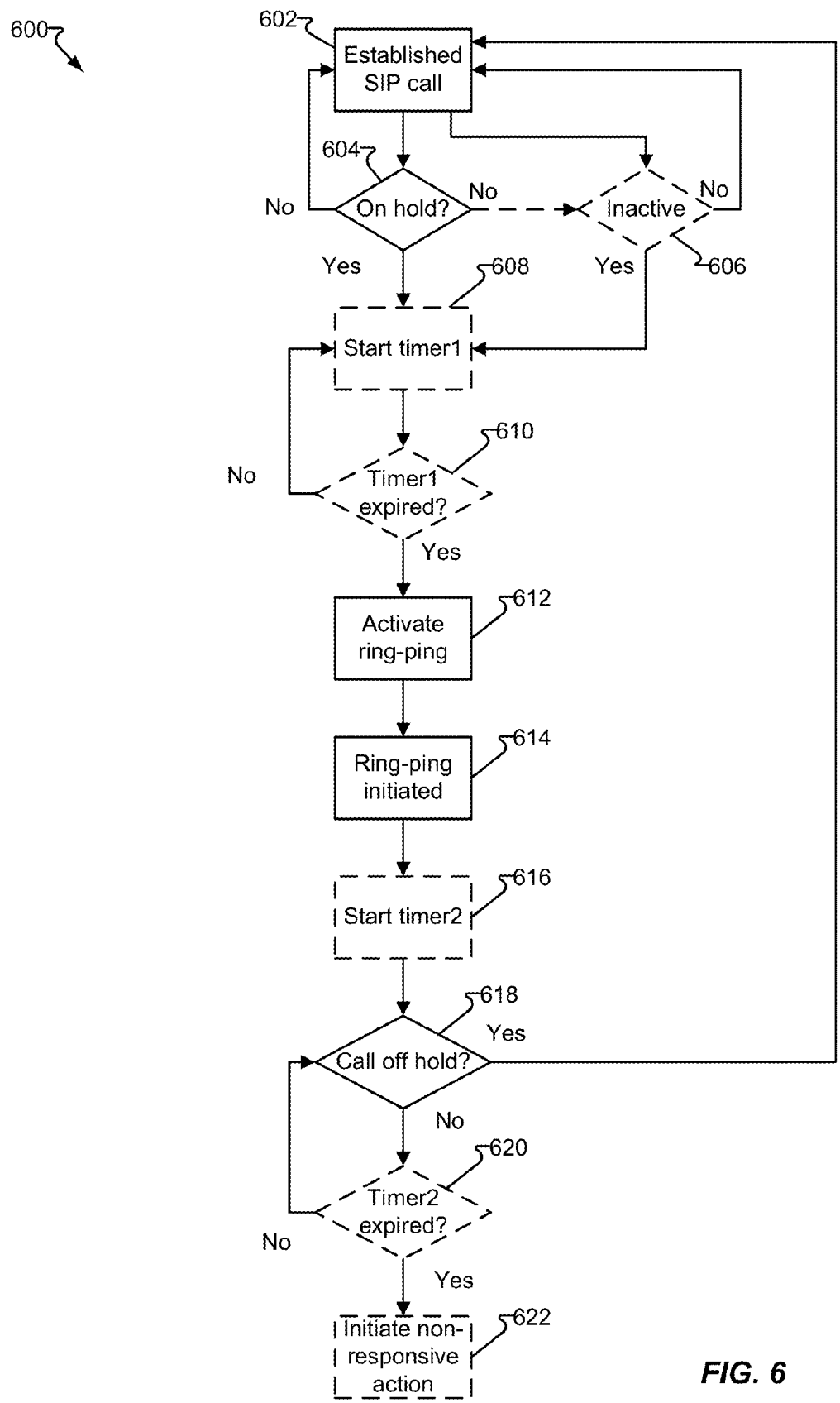
FIG. 6 depicts a first process in accordance with embodiments of the present disclosure.

FIG. 6 depicts process 600 in accordance with embodiments of the present disclosure. In one embodiment, process 600 begins at step 602 whereby a SIP call has been established. For example, call 116 (see FIG. 1) between user agent 102 and user agent 104 has previously been established in the call is underway. Next, step 604 determines whether or not the established call, provided in step 602, has been placed on hold. In one embodiment, if step 604 is determined in the negative, processing continues back to step 602 whereby the established call continues. In another embodiment, if step 604 is determined in the negative, processing continues to step 606 whereby a determination is made whether the call is inactive with respect to a participant's contribution. For example, step 606 may determine that a user of a particular user agent is no longer communicating or otherwise providing content to the call established in step 602. Step 606 may determine that the line is idle. It should be appreciated that an inactive line associated with a particular user agent may still provide audible content, such as line noise (e.g., clicks, pops, static, etc.), background noise (e.g., other parties talking, etc.), or other audible content other than speaking or otherwise providing meaningful content associated with an active participation on the part of the user associated with the user device.

In another embodiment, step 602 may proceed directly to step 606. As can be appreciated by one of ordinary skill in the art, step 606 may be executed first or concurrently with step 604 whereby one of step 604 and 606 being answered in the negative may cause processing to proceed to the other of step 604 and step 606. Upon determining step 604 in the negative or, if implemented, step 606 being also determined in the negative, processing may continue back to step 602. If one or both of steps 604 and 606 are determined in the positive, processing may continue to step 608.

In one embodiment, step 608 and step 610 are implemented, such as by a server, for example, call server 106 and/or an endpoint, such as user agent 102. Step 608 starts at a first timer then step 610 determines if the first timer has expired. If step 610 is determined in the negative, processing may continue back to step 608. Otherwise, if step 610 is determined in the positive, step 612 may then be executed.

Step 612 activates a ring-ping function associated with a still participating endpoint, such as user agent 102. The activation of the ring-ping functionality may have been previously provided, in which case step 612 may be omitted. In another embodiment, a soft button, hard button, menu item, spoken command, and or other feature associated with initiating a ring-ping message is activated on a user device, such as user agent 102. As a further option, step 612 may be associated with an internal function, such as when user agent 102 or a similar device displays or otherwise indicates the ring-ping availability even when selecting such a command was previously disabled. Next, step 614 initiates a ring-ping message, such as upon the user input associated with a ring-ping message. The ring-ping message is then forwarded to the destination device, such as user agent 104, which may comprise one or more forwarding operations, such as a forwarding by call server 106.

Once the ring-ping message has been sent, a second timer is optionally started at step 616. Next, step 618 determines if the call has been taken off hold. If yes, process 600 may return to step 602 and thereby continue the call. However if step 618 determined that the call is still on hold processing continues to step 620 whereby a determination is made if the second timer initiated in step 616 has expired. If no, process 600 may loop back to step 618. Otherwise, processing may continue to step 622.

Step 622 is variously embodied and may comprise one or more procedures selected as a matter of design choice, business rule, participant rule, or other factor. In one embodiment, step 622 causes the endpoint that has placed the call on hold to release the hold, at which time the holding endpoint becomes active and a participant on another endpoint, such as user agent 102, may hear and/or be heard from the endpoint that placed the call on hold. In another embodiment, step 622 may notify a supervisor or other party associated with a user or endpoint that has placed the call on hold, such as supervisor 308 associated with user agent 302. Supervisor 308, as a supervisor for agent 306, is notified that agent 306 utilized user agent 104 and placed the call, which was established in step 602, on hold for a period of time four times greater than that set by the timer value previously determined and initiated in step 616. In another embodiment, step 622 may initiate another channel of communications, such as a text message, email, and/or other alert. It is possible that the user who placed the call on hold requires additional time and does not wish to un-hold the call, a scenario that is discussed more fully with respect to FIG. 7.

In another embodiment, step 618 may determine if the call established in step 602 is again active, such as when step 606 was determined in the affirmative. In another embodiment, steps 616, 620, and 622 are omitted. In which case, process 600 waits until either step 618 is determined in the positive, at which time process 600 can return to step 602, or until the held caller drops the connection and process 600 is terminated.

Figure 7:
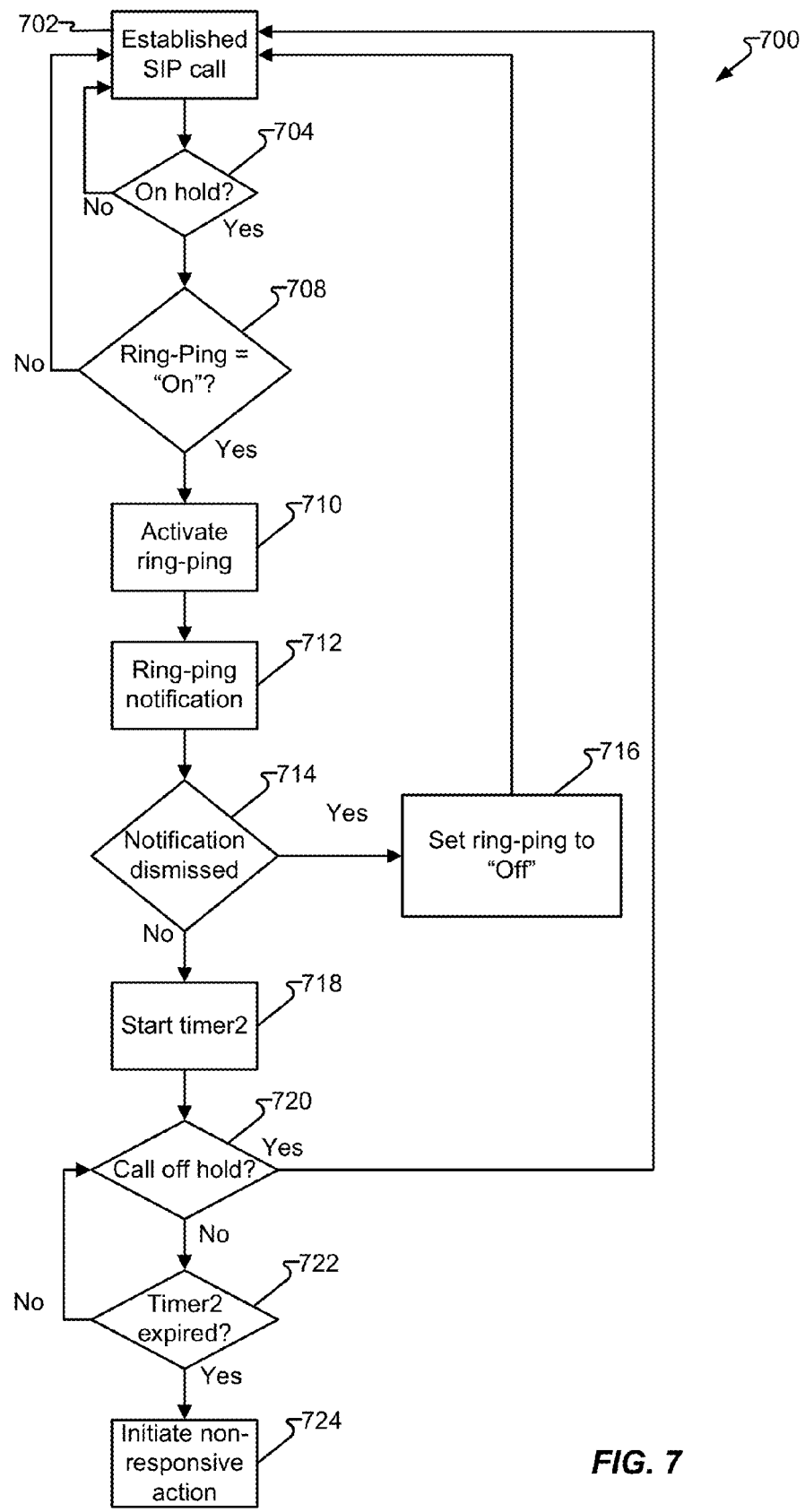
FIG. 7 depicts a second process in accordance with embodiments of the present disclosure.

FIG. 7 depicts process 700 in accordance with embodiments of the present disclosure. In one embodiment, process 700 begins at step 702 with established SIP call, such as call 116 between user agent 102 and user agent 104 (see FIG. 1). Next, step 704 determines if the call is on hold and, if no processing, continues back to step 702. If yes, step 704 proceeds to step 708, whereby a determination is made whether a ring-ping functionality is on or otherwise enabled. In one embodiment, process 700 initially sets ring-ping functionality to "on" whereby process 700 continues to step 710.

Step 710 activates a ring-ping functionality, if otherwise or previously disabled. Step 710 may optionally provide an indication to the user that ring-ping functionality is now available, such as by a menu item, soft button, illuminated hard button, or other feature, which may be an indicator of the available functionality provided by an endpoint, such as user agent 102. The ring-ping message is then received by an endpoint, such as user agent 104, whereby the notification is presented in a human-perceivable form (e.g., tone, spoken message, ringer activation, light, vibration, etc.). After notification step 712 has been initiated, one of three possible outcomes may result. First, the call may be taken off hold; second, the notification received in step 712 may be acknowledged, but the call remains on hold; and, third, no action is taken.

Step 714 determines whether the notification has been dismissed or otherwise acknowledged without removing the call from its present hold state. For example, a user associated with user agent 104 may select an "ignore ring-ping" message or otherwise acknowledge the notification. If step 714 is determined in the affirmative, process 700 may continue to step 716, whereby ring-ping functionality is set to "off" In this embodiment, process 700 returns to step 702, step 704 again determines that the call is on hold, whereby step 708 is now determined in the negative and process 700 continues to step 702. The execution of the aforementioned steps of process 700 thereby provides a user who has placed the call on hold to acknowledge the ring-ping message provided in step 712 only once. As can be appreciated, step 700 may be modified such that an extended hold time may again cause the ring-ping functionality to be set to "on."

If step 714 is determined in the negative, step 718 may start a timer. Next, step 720 determines if the call has been removed from hold. If yes, step 720 proceeds to step 702 and the established call continues normally until terminated by the parties engaged therein. However, if step 720 is determined in the negative, processing continues to step 722, whereby determination is made to determine if the timer has expired. If step 722 is determined in the negative, step 720 may again be executed in the loop created, which is executed until one of step 720 and step 722 is determined in the affirmative. If step 722 is determined in the affirmative, the timer has expired and step 724 is initiated to perform a nonresponsive action. Step 724 may comprise taking the call off of hold, alerting a supervisor associated with the party who placed the call on hold, or other action, as may be determined by business rule and/or design option.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU), or logic circuits programmed with the instructions to perform the methods (FPGA). These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium, such as a storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A communication server, comprising:
a network interface that facilitates a call between a first user agent and a second user agent, the call being placed on hold by the second user agent; and
a processor that receives from the first user agent a ring-ping message while the call is on hold between the first user agent and the second user agent and forwards the ring-ping message to the second user agent to cause the second user agent to present a ring-ping notification; and
wherein the ring-ping message comprises a Session Initiation Protocol (SIP) INVITE message comprising a ring-ping header.

2. The communication server of claim 1, wherein the processor is further configured to monitor the call and determine that the second user agent has placed the call on hold by further determining the second user agent is not actively communicating with the call and in response to the determination, the processor causes the network interface to signal the first user agent to activate a ring-ping option as a prerequisite to the processor receiving the ring-ping message.

3. The communication server of claim 2, wherein the processor is further configured to determine that the second user agent on hold upon determining the second user agent has not actively communicated for a previously determined period of time.

4. The communication server of claim 2, wherein the processor is further configured to determine that the second user agent is not actively communicating upon determining that the call has been absent of content provided by a user associated with the second user agent for at least a previously determined period of time.

5. The communication server of claim 1, further comprising a SIP proxy.

6. The communication server of claim 1, wherein the processor is further configured to, upon determining the second user agent has not acknowledged the ring-ping message during a predetermined period of time starting at a time the ring-ping message was forwarded to the second user agent and upon the determination, sending a SIP INVITE message to a third user agent to join the call.

7. The communication server of claim 6, wherein the third user agent is associated with a supervisor for a user associated with the second user agent.

8. The communication server of claim 1, wherein the processor is further configured to, upon determining the second user agent has acknowledged the ring-ping message, discard any subsequent ring-ping messages from the first user agent.

9. The communication server of claim 1, wherein the processor is further configured to, upon determining the second user agent has acknowledged the ring-ping message, discard any subsequent ring-ping messages addressed to the second user agent.

10. A first communication device, comprising:
a network interface that facilitates a call with a second communication device;
a user input option associated with a ring-ping message; and
a processor that, while the call that is currently on hold and upon receiving a user input associated with the user input option, initiates a ring-ping message and causes the network interface to send the ring-ping message to the second communication device; and
wherein the ring-ping message comprises a Session Initiation Protocol (SIP) INVITE message comprising a ring-ping header.

11. The first communication device of claim 10, wherein the processor is configured to initially disable the user input option upon initiation of the call, monitor the call, and, upon determining that the call has been absent of content provided by a user associated with the second user agent, for at least a previously determined period of time, enable the user input option.

12. The first communication device of claim 10 wherein the processor is further configured to determine that the call is on hold upon determining the call has been absent of content provided by the user associated with the second user agent for a previously determined period of time.

13. A first communication device, comprising:
a network interface that facilitates a call with a second communication device;
a ring-ping alert indicator; and
a processor that, during the call and while the call is on hold by the second communication device, receives a ring-ping message from the second communication device via the network interface and causes the ring-ping alert indicator to activate; and wherein the ring-ping message comprises a Session Initiation Protocol (SIP) INVITE message comprising a ring-ping header.

14. The first communication device of claim 13, further comprising:
   a first user input option associated with a call hold feature to place the call on hold;
   a second user input option associated with an acknowledgment of the activated indicator; and
   wherein the call is absent content comprises the call being placed on hold by a user input associated with the first input option; and
   wherein the processor is further configured, upon receiving the user input associated with the second user input option, to cause the network interface to send an acknowledgement addressed to the second communication device while maintaining the call on hold.

15. The first communication device of claim 14, wherein the processor is further configured to discard subsequent ring-ping messages.

16. The first communication device of claim 15, wherein the processor ceases to discard the subsequent ring-ping messages upon the passage of a previously determined period of time while the call remains on hold.

17. The first communication device of claim 14, wherein the processor is further configured to signal a third communication device upon determining that previously determined time has passed since the arrival of the ring-ping message and both the call remains on hold and the second user input has not been received.

18. The first communication device of claim 13, wherein the ring-ping indicator further comprises a ringer of the first communication device.

19. The first communication device of claim 13 wherein the ring-ping alter indicator comprises at least one of an audible tone, graphical display, textual message, and tactile indicator.

* * * * *